United States Patent

Woodward, Jr.

Patent Number: 6,034,462
Date of Patent: Mar. 7, 2000

[54] CYLINDRICAL AIR GAP ELECTRICAL MACHINES

[76] Inventor: Richard C. Woodward, Jr., 1119 Oakdale, Fullerton, Calif. 92831

[21] Appl. No.: 09/196,606

[22] Filed: Nov. 20, 1998

[51] Int. Cl.$^7$ .................................................. H02K 1/12
[52] U.S. Cl. ..................... 310/254; 310/257; 310/258; 310/259; 310/266; 310/269; 310/192; 310/104; 310/268
[58] Field of Search .................................. 310/254, 257, 310/258, 259, 266, 269, 192, 104, 268

*Primary Examiner*—Nestor Ramirez
*Assistant Examiner*—Thanh Lam
*Attorney, Agent, or Firm*—Cleveland R. Williams

[57] ABSTRACT

A cylindrical or radial air gap, electrical machine is defined which comprises a circular rotor section having a serrated circular surface area mounted on a shaft with rotation means, two or more circular stator sub sections having circular serrated surface areas are assembled around the circular rotor section, which define an air gap between them. Normally after stator sub sections are assembled around the circular rotor section, end brackets or housings units are usually clamped around them.

5 Claims, 5 Drawing Sheets

CYLINDRICAL AIR GAP ELECTRICAL MACHINES

BACKGROUND OF THE INVENTION

1. Field of the Invention

This invention resides in an improved cylindrical air gap machine having increased efficiency. The machine has increased surface area in the air gap by changing the smooth cylindrical surfaces of the rotor and stator to surfaces with grooves forming a serrated profile.

In an induction type machine and a direct current type machine, the power output of said machines depends upon the produced magnetic flux that crosses an air gap between the rotor and the stator in the machine. If the air gap or the air gap flux density between the surface areas of the rotor and stator are too large, a large loss in ampere turns is noted because of the increased energy required.

In the past, others have tried to solve the energy loss across the air gap in cylindrical machines by increasing the length of the rotor and stator or by decreasing the air gap between the rotor and stator. Both of these methods suffer from the disadvantage of requiring an increased diameter motor shaft because of magnetic side pull. Another disadvantage is that a larger machine is required to obtain the desired performance.

2. Description of the Prior Art

Numerous attempts have been made in the past to increase the efficiency and reduce the energy consumption of electric machines.

U.S. Pat. No. 3,296,475 to Parker relates to dynamo-electric machines, rotors therefor. The patent describes an axial air gap machine having a lower rotor resistance thereby reducing power losses in said machine.

U.S. Pat. No. 3,304,450 to Bask, Jr., et al., describes an axial air gap dynamo-electric machine, wherein said machine is brushless and contains a rotor spaced apart from a stator armature by an axial air gap. A rotor disc, as described above, has at least one of its sides juxtaposed to a stator core provided with an armature winding with a narrow axial air gap between the faces of the stator and of the rotor.

U.S. Pat. No. 3,581,389 to Mori, et al., discloses a method for producing a magnetic core for an electric rotating machine which has an axially spaced air gap as in the case of a disc-type rotating machine.

U.S. Pat. No. 4,207,487 to Beyersdorf describes a disc-type, dynamo-electric machine having two stators and one rotor, active air gaps between each stator and the rotor, two annular energizing windings in the stators, and two non-active or auxiliary air gaps formed in a smooth region between the stators and the rotor.

U.S. Pat. No. 5,093,596 to Hammer relates to a combines linear-rotary direct drive step motor which provides both linear and rotary motion over a predefined range, e.g. along a portion of the longitudinal axis of the rotor shaft. The rotor and stator of the rotary step motor are described as having teeth.

U.S. Pat. No. 5,177,392 to Scott discloses a disc-type machine having a plurality of alternating stator and/or rotor sections. The stator has micro-laminated stator teeth molded from cut steel particles, mounted on a large disc of composite fiber material which is the main structure component of each stator section.

U.S. Pat. No. 5,777,421 to Woodward Jr. teaches a disc-type electrical machine having enhanced efficiency and effectiveness. The machine comprises a housing unit, a stator connected to said housing unit, a shaft rotateably connected to the stator housing unit with rotation means. A rotator connected to the shaft wherein the stator surface area and the rotor surface area are serrated.

It can readily be seen that serrated air gap surfaces improve efficiency of machines. However, a change in the rotor and a major change in the stator would be required for cylindrical machines to obtain the desired efficiency.

A magazine entitled "MACHINE DESIGN", a Penton Publication which was published Dec. 16, 1965 and entitled "ELECTRICAL MOTOR" describes different types of electrical motors and what they are used for. The article gives a laundry list of electrical motors and companies as well as new materials used to construct said motors.

SUMMARY OF THE INVENTION

The present invention resides in an improved cylindrical air gap, electrical machine having increased surface area on a rotor and stators which define an air gap between them. The cylindrical air gap, electrical machine comprises a housing, a stator which is composed of two or more sub stator sections assembled around a rotor, a shaft rotatably attached to end brackets and having rotation means, the rotor is attached to the shaft, and a cylindrical area of the rotor and stator surface areas define a small radial air gap there between. It should be noted that, the housing around the rotor and stator sections may be omitted with the end brackets being directly attached to the stator sections.

DETAIL DESCRIPTION OF THE INVENTION

This invention resides in a cylindrical air gap machine with increased efficiency by serrating the surfaces of the cylindrical rotor and cylindrical stator of said machine. This requires the stator to contain two or more sub sections. For economical reasons the inside diameter of the stator punching and the outside diameter of the rotor punching will be changing, wherein each wound stator sub section must be wound complete. Many types of cylindrical machines are now manufactured. These all could be changed to save up to 40% of the ampere turns required to cross the air gap between the rotor and stator by serrating the cylindrical surface areas of the rotor and stator sections. Also, designs with less weight are possible due to the increased efficiency of the machines herein.

Figure 1:
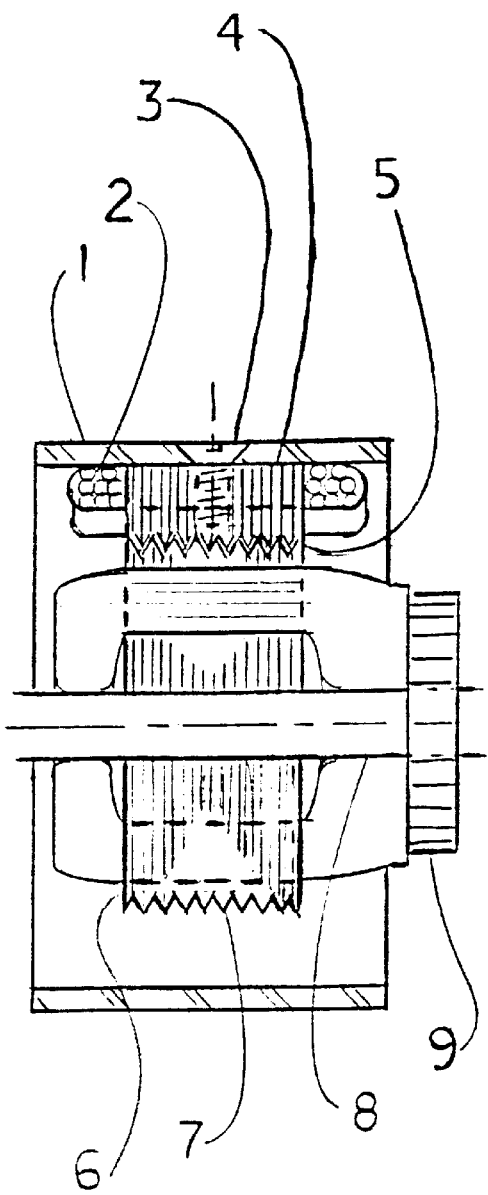
FIG. 1 is a partial cross-section drawing of a DC machine with a serrated air gap.

FIG. 1 shows a partial cross-section of a DC machine where shaft 8 and commutator assembly 9 are part of armature assembly 6 with serrated surface 7. Four field poles 4 and field coils 2 are assembled around armature assembly 6, then slid into frame or housing 1 and secured in place with flat head screws 3 producing air gap 5.

Figure 2:
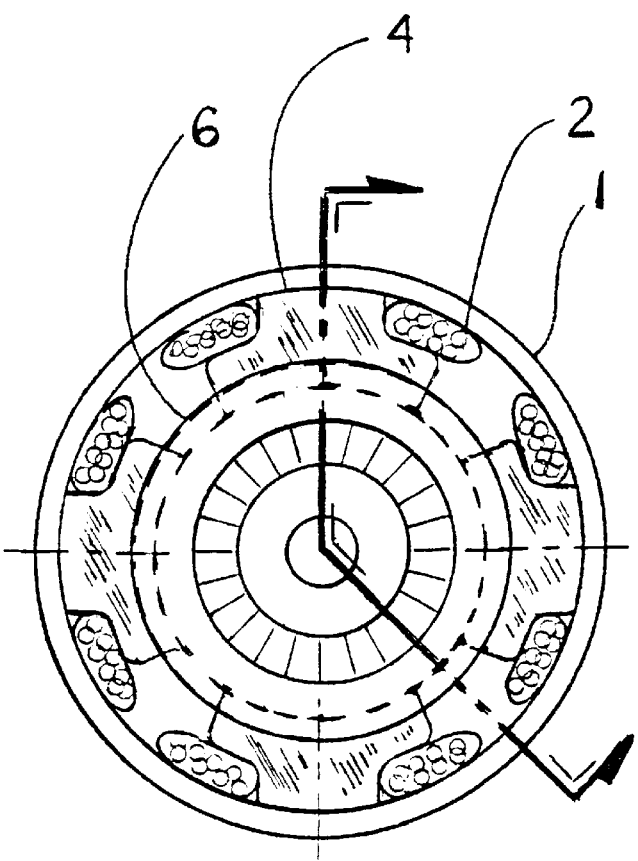
FIG. 2 is a front cross-section drawing of the DC machine shown in FIG. 1.

FIG. 2 shows front cross-section described in FIG. 1 showing frame or housing 1 which can be either a single section or two sections. Field poles 4 and field coils 2 are assembled around armature assembly 6.

Figure 3:
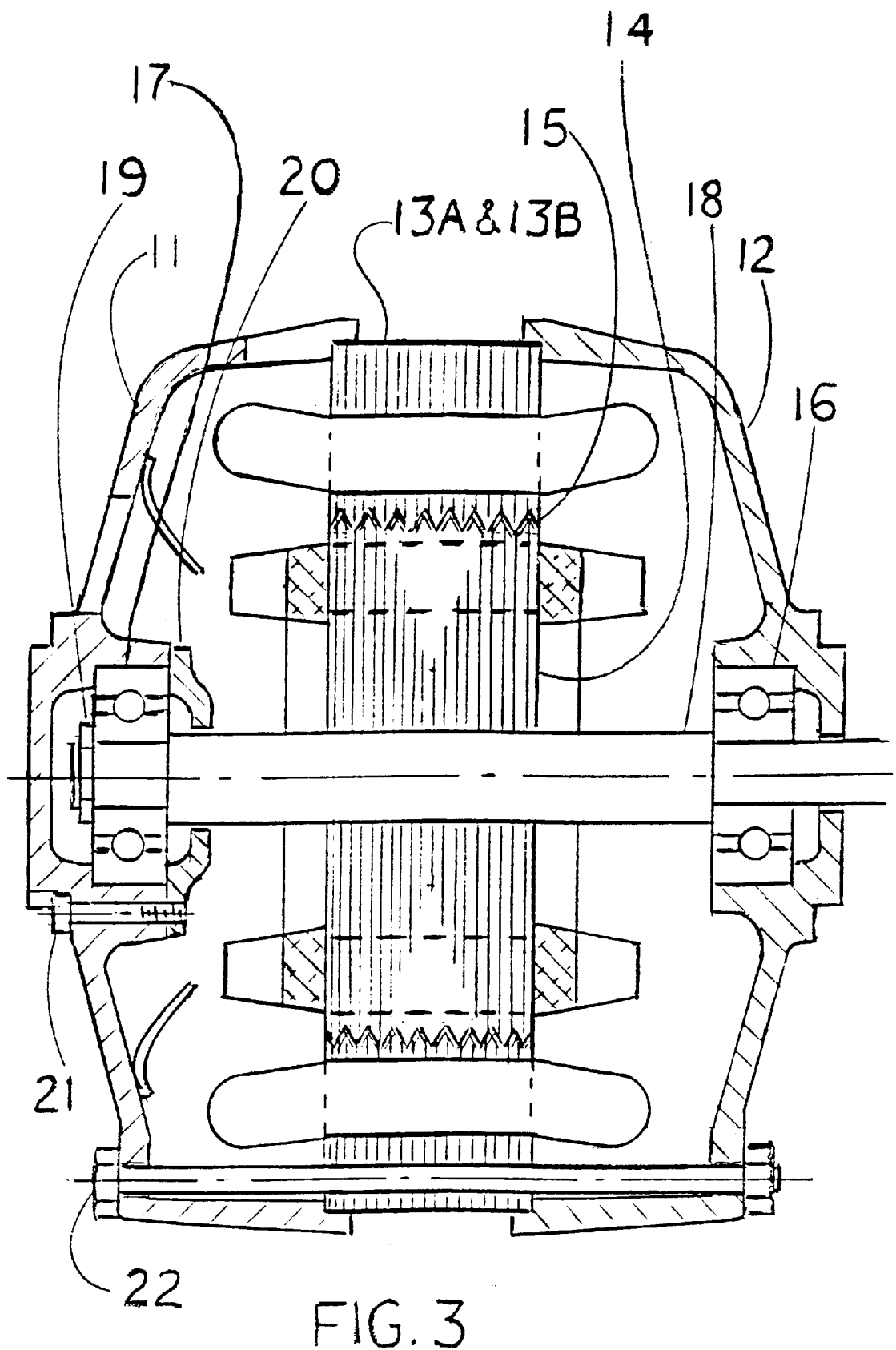
FIG. 3 is a cross-sectional drawing of a serrated air gap cylindrical machine with end brackets clamping stator sections assembled around a rotor having a serrated outer diameter surface.

FIG. 3 shows an improved cylindrical air gap machine with serrated air gap 15. Rotor assembly 14 is mounted on to shaft 18. Ball bearing 16 is connected to one end of shaft 18 and bearing cap 20 is slipped over shaft 18 before ball bearing 17 is connected and secured with snap ring 19. Now, wound stator sections 13A and 13B are assembled around rotor assembly 14. It should be noted, that from about 2 to about 50, especially 2 to about 20, stator sections can be assembled around rotor assembly 14, preferably 2 stator sections. It should be noted that the size of the electrical machine determines the number of stator sub sections required for said machine. Some larger machines would require 50 or more stator sub sections assembled around the rotor assembly. Pulley end bracket 12 is connected to rotating means ball bearing 16 as pulley end bracket 12 clamps wound stator sections 13A and 13B in place around rotor assembly 14. Short end bracket 11 is connected to rotating means of support ball bearing 17 as short end bracket clamps wound stator sections 13A and 13B. Pulley end bracket 12 and short end bracket 11 are firmly attached to each other with cap screw and nut 22. Bearing cap 20 is secured to short end bracket 11 with cap screws 21.

Figure 4:
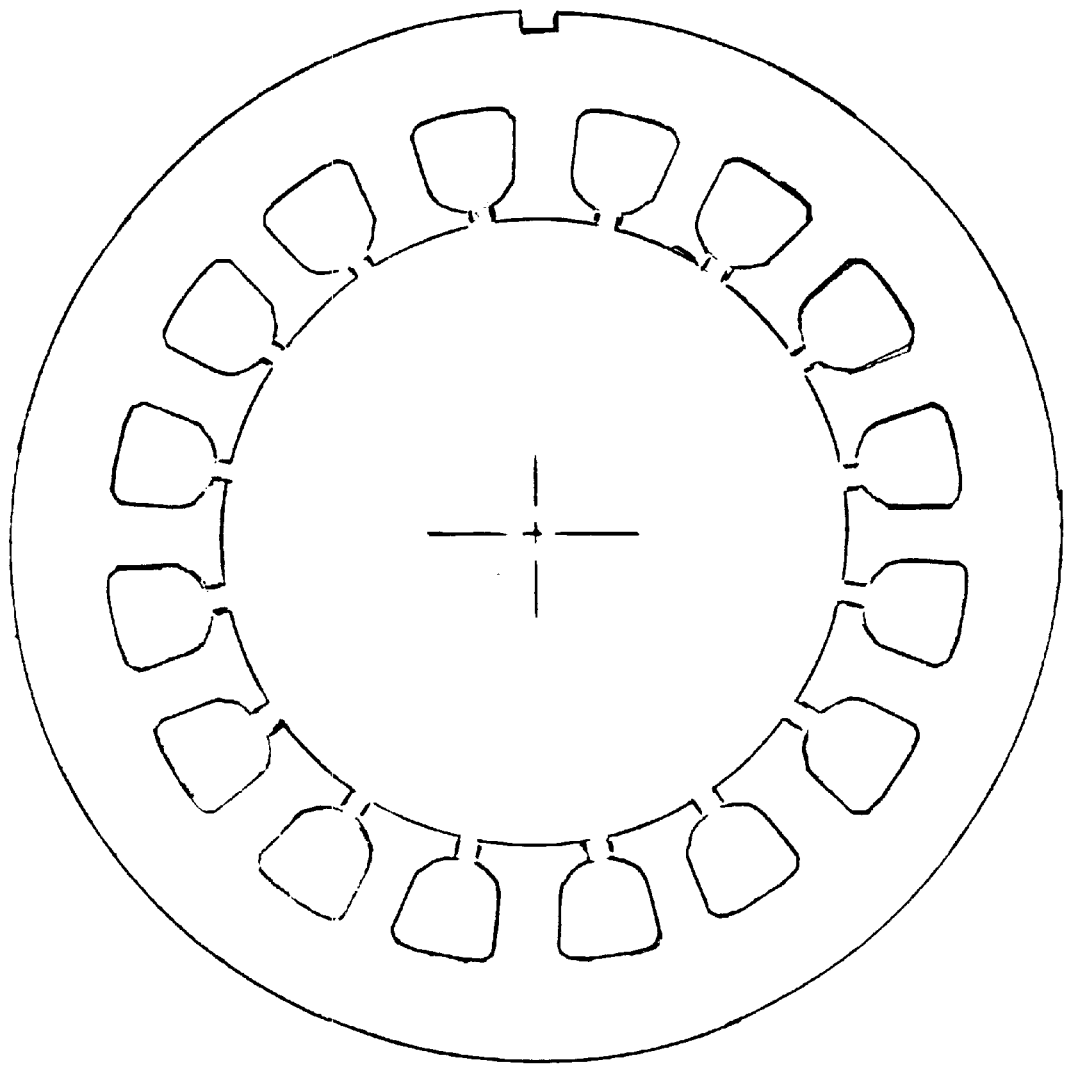
FIG. 4 is a drawing of a complete circular stator punching with 16 slots that can be used in a r pole single phase motor with cylindrical air gap.

FIG. 4 is a drawing of a complete circular stator punching with 16 slots that can be used in a 4 pole single phase motor with cylindrical air gap.

Figure 5:
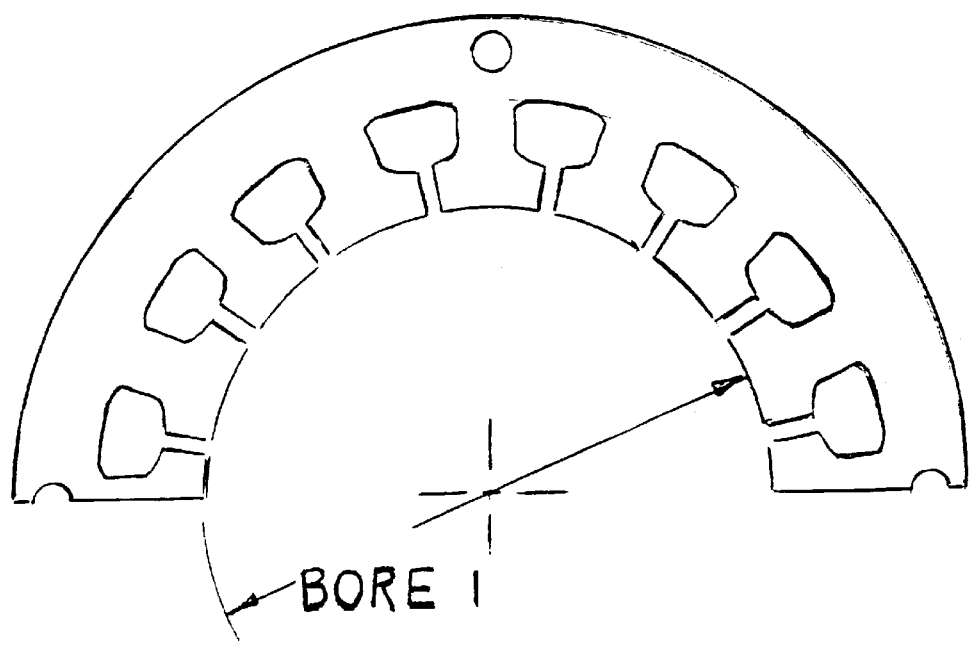
FIG. 5 is a drawing of a stator punching to be used in a 4 pole single phase motor with a serrated air gap. This punching with 8 slots would be used in a half stator section and with bore 1 only would require machining for serrations.

FIG. 5 is a drawing of a stator punching to be used in a 4 pole single phase motor with a serrated air gap. This punching with 8 slots can be used in a half stator sub section and with the small bore "1" only, and would require machining to form the serrations.

Figure 6:
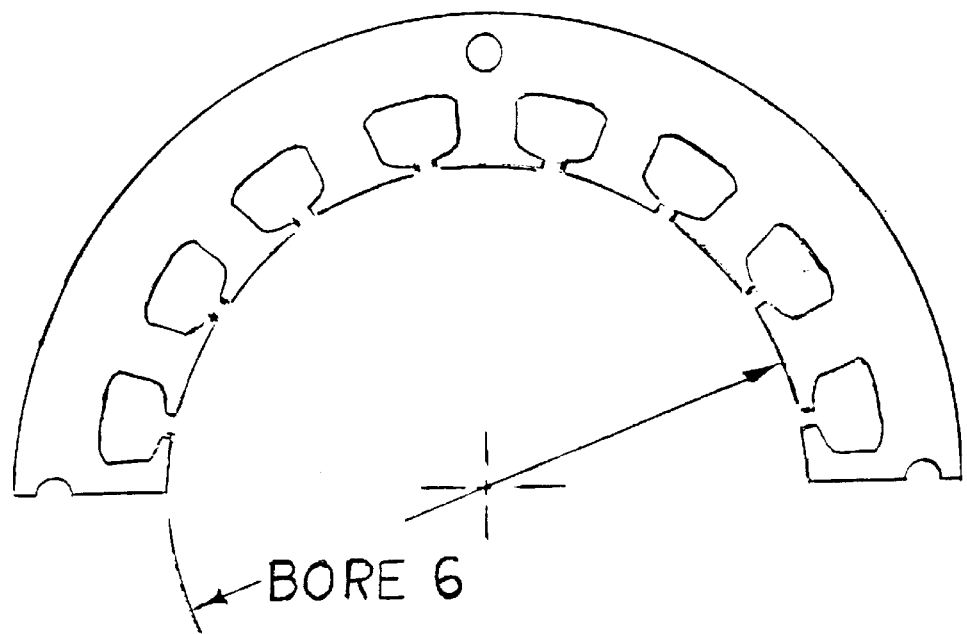
FIG. 6 is a drawing of a stator punching the same as FIG. 5 except the bore is larger.

FIG. 6 is a drawing similar to FIG. 5 except the bore is larger. Depending on production quantities, punchings with different bores can be made. A desirable increment change in bore diameter would be 0.086 inch, for each of six punches.

Figure 7:
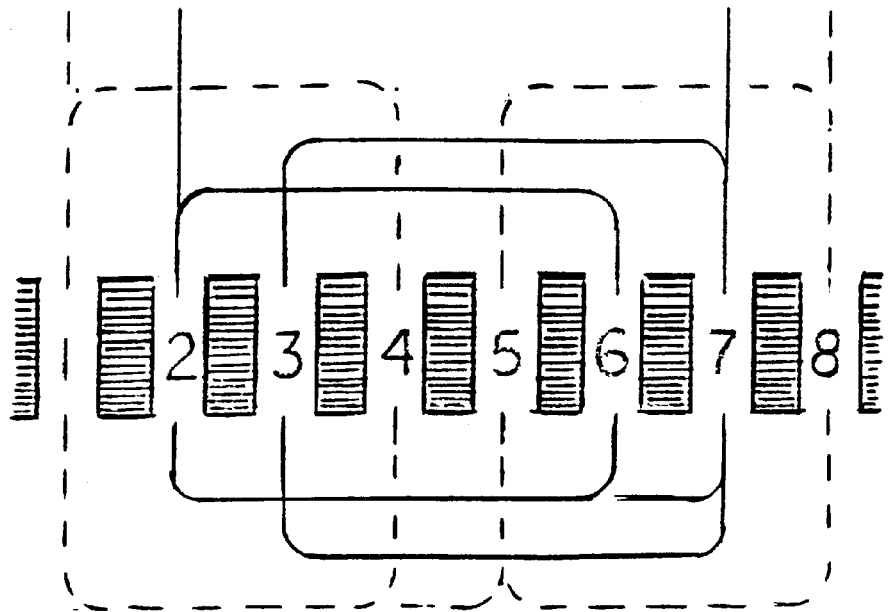
FIG. 7 is a winding diagram for a Single-Phase 4 pole motor with 16 total slots.

FIG. 7 is a winding diagram for a Single-Phase 4 pole motor with 8 slots per one stator section of 2 sections. This motor would have 16 slots total. The windings (wire) of each stator sub section is complete and the combination of stator sub sections constitute the whole windings for the electrical machine.

Figure 8:
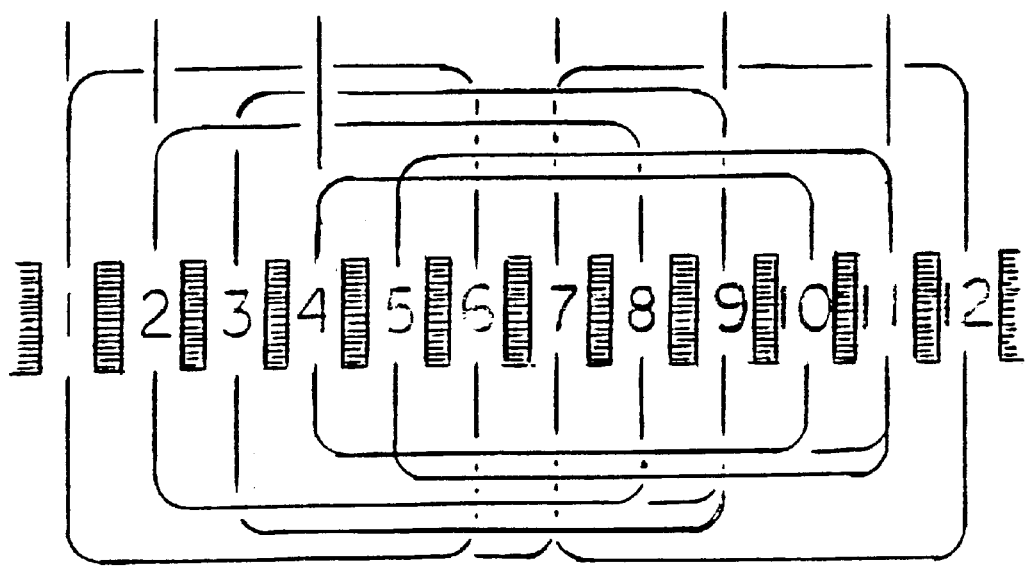
FIG. 8 is a winding diagram for a 3 phase 4 pole motor with 24 total slots.

FIG. 8 is a winding diagram for a 3 phase 4 pole motor with 12 slots per one stator section of 2 sections. This motor would have a total of 24 slots. A single coil per slot was shown in this figure for ease of viewing. It should be noted however, that other possibilities include a 2-layer, fractional-pitch lap winding with 2-slots per pole per phase.

Obviously, many modifications and variations of the invention, as hereinbefore set forth, may be made without departing from the spirit and scope thereof, and therefore, only such limitations should be imposed as are indicated in the appended claims.

I claim:

1. A cylindrical air gap electrical machine which comprises, a cylindrical rotor section mounted on a shaft with rotation means, a cylindrical stator section comprising from 2 to 50 stator sub sections assembled around said cylindrical rotor section, wherein the surface area of the cylindrical rotor section and the cylindrical stator section are serrated and define an air gap between them.

2. The cylindrical air gap, electrical machine of claim 1, wherein the cylindrical stator section comprises from 2 to 20 stator sub sections.

3. The cylindrical air gap electrical machine of claim 1, wherein stator sub sections each are complete with a separate portion of the whole winding.

4. A radial air gap electrical machine, which comprises a circular armature mounted on a shaft with rotation means, from 2 to 50 circular field poles which slide over said circular rotor, wherein the surface areas of the circular rotor and stator sections are serrated and define an air gap between them.

5. A cylindrical air gap electrical machine which comprises a cylindrical armature mounted on a shaft with rotation means, from 2 to 50 cylindrical pole fields assembled over said circular armature, wherein the surface areas of the circular armature and the circular pole fields are serrated and define an air gap between them.

* * * * *